United States Patent [19]
Cook, Jr. et al.

[11] Patent Number: 5,346,181
[45] Date of Patent: Sep. 13, 1994

[54] HAULING SHEAVE WITH CLEATS

[75] Inventors: Harold T. Cook, Jr., Bainbridge Island; Donn B. Furlong, Bellevue; Robert A. Svendsen; Allan P. Rustad, both of Seattle, all of Wash.

[73] Assignee: Marco Seattle, Inc., Seattle, Wash.

[21] Appl. No.: 713,164

[22] Filed: Jun. 11, 1991

[51] Int. Cl.$^5$ .............................................. B66D 1/30
[52] U.S. Cl. .................... 254/374; 226/190; 474/175; 474/191
[58] Field of Search ................ 254/371, 372, 374; 226/190, 193; 474/191, 192, 175

[56] References Cited

U.S. PATENT DOCUMENTS

| | | | |
|---|---|---|---|
| 423,132 | 3/1890 | Conyngham | 474/175 |
| 449,676 | 4/1891 | Hall | 474/175 |
| 1,765,402 | 6/1930 | Carter | 474/192 |
| 2,733,530 | 2/1956 | Puretic | 254/372 |
| 3,154,260 | 10/1964 | Stanislao et al. | 226/190 |
| 3,797,806 | 3/1974 | Demmert | 254/372 |
| 4,413,981 | 11/1983 | White et al. | 474/175 |
| 4,504,022 | 3/1985 | Stang et al. | 226/190 |
| 4,580,766 | 4/1986 | Woodgate | 254/371 |

Primary Examiner—Katherine Matecki
Attorney, Agent, or Firm—Christensen, O'Connor, Johnson & Kindness

[57] ABSTRACT

A hauling block 20 having a sheave 30 comprising two identical halves 32 and 34. The hauling surfaces 40 and 42 of the sheave 30 carry outwardly extending, cleat receiving pockets 54. Reinforced cleats 50 are seated in the pockets 54 and releasably fastened to the sheave 30.

10 Claims, 7 Drawing Sheets

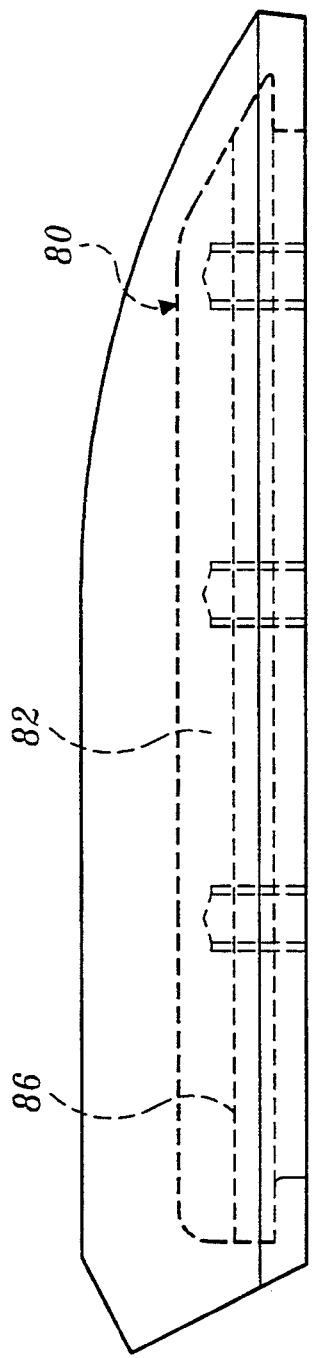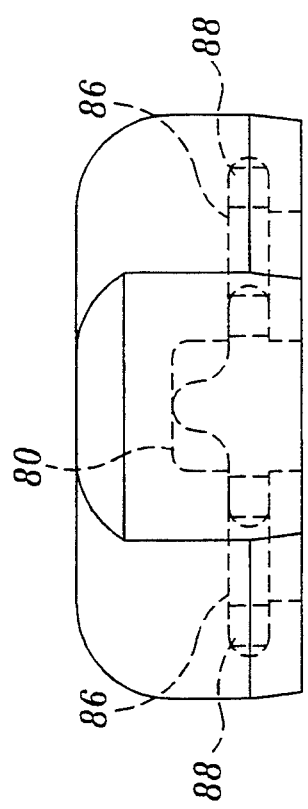

HAULING SHEAVE WITH CLEATS

FIELD OF THE INVENTION

The present invention relates to a hauling block for nets or line, and more particularly, to an improved sheave for use with the hauling block having improved cleats mounted thereon.

BACKGROUND OF THE INVENTION

Powered hauling blocks are used on fishing vessels such as purse seiners for hauling nets from the water and depositing the nets on the deck of the vessel. The block includes a powered sheave that engages the net and forwards it through the block. To improve the grip the sheave can exert on the net, a variety of different cleats have been associated with the interior diverging net hauling surface of the sheave. The cleats have been made of a variety of materials and have taken a variety of shapes. Conventionally, cleats are formed of a hard rubber compound and positioned on the hauling surface of the sheave. The entire hauling surface as well as the cleat is then continuously coated with a rubber compound. When the cleats wear, the entire sheave must be stripped, new cleats laid down, and the sheave recoated. Another type of cleat is composed of a hard rubber compound that is bolted to the hauling surfaces. These cleats tend to deteriorate rather quickly and must be replaced quite often. Cleats have also been made of aluminum and are bolted or welded to the sheave. While they do offer satisfactory wear characteristics, the aluminum cleats are expensive and tend not to grip as well as rubber. Moreover, prior cleats have generally had parallel sides, which tend to cause the net to rise radially out of the bight of the sheave, which in turn tends to cause slippage of the net in the sheave.

SUMMARY OF THE INVENTION

The present invention provides an improved sheave mounted for rotation on a support frame to form a net hauling block. First and second sheave halves include central hub portions. The first and second sheave halves are joined together at their hub portions to form a sheave having a hub and hauling surfaces. The sheave halves have mutually opposing hauling surfaces that extend outwardly in a divergent manner from the hub. Each of the sheave halves terminates in a circumferential rim portion. Means are provided for joining the first and second sheave halves together. In accordance with the present invention, each of the sheave halves has a plurality of cleat receiving pockets extending outwardly from the hub portion along the hauling surfaces. The pockets have bottom surfaces and longitudinal side walls. An improved cleat has a bottom portion inset into the pockets with the side walls that extend substantially perpendicularly upwardly from the hauling surface.

BRIEF DESCRIPTION OF THE DRAWINGS

A better understanding of the present invention can be derived by reading the ensuing specification in conjunction with the accompanying drawings wherein:

FIGS. 6, 7, 8 and 9 are respectively side, inner end, outer end and plan views of the improved cleat.

DETAILED DESCRIPTION OF THE PREFERRED EMBODIMENT

Figure 1:
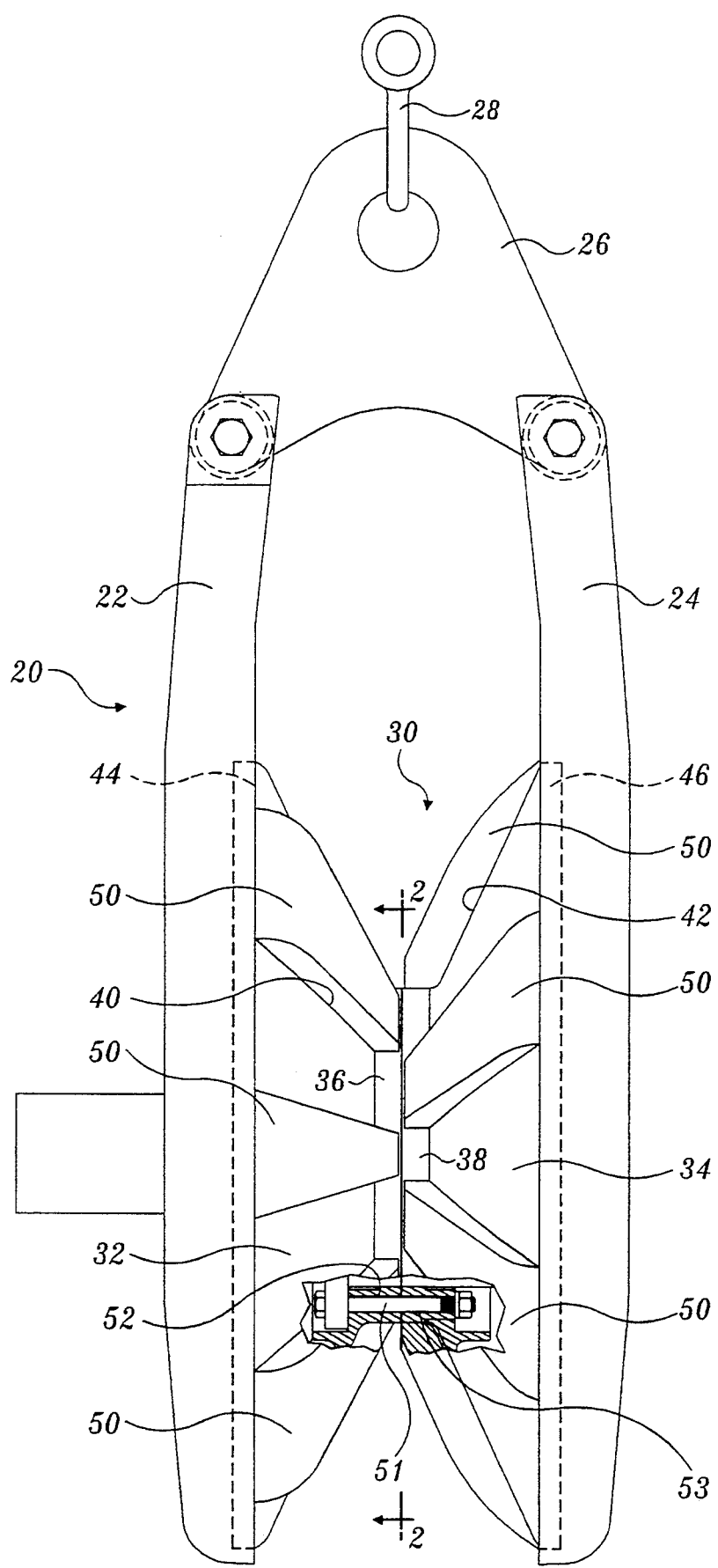
FIG. 1 is an end view of the hauling block incorporating the improved sheave and cleats constructed in accordance with the present invention.

Referring first to FIG. 1, the hauling block generally designated 20 has left and right support shells 22 and 24. The upper ends of the support shells 22 and 24 are coupled to a yoke 26 from which the block 20 is suspended in a conventional manner from a clevis 28. An improved sheave 30 constructed in accordance with the present invention is mounted for rotation in the left and right support shells 22 and 24 in a conventional manner. The sheave 30 is comprised of two identical halves 32 and 34, each having hub portions 36 and 38, hauling surfaces 40 and 42, and outer rims 44 and 46. The hub portions 36 and 38 are joined together to form a substantially annular hub. The hauling surfaces diverge outwardly from the hub to the respective rims 44 and 46, thus forming a bight for hauling nets. Cleats 50, constructed in accordance with the present invention, are circumferentially spaced around and fastened to the sheave halves 32 and 31, as will be described in more detail below.

Figure 2:
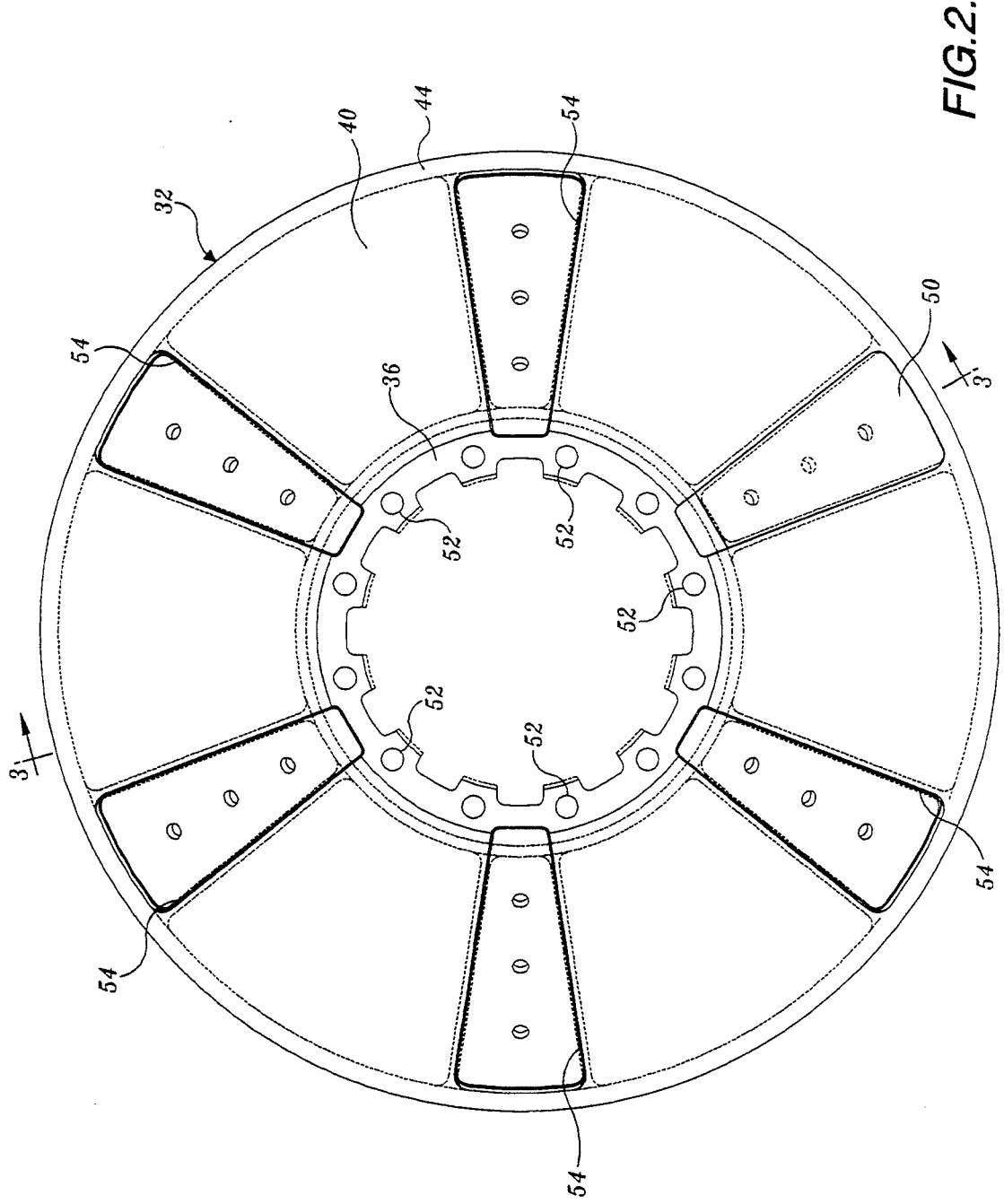
FIG. 2 is a side view of an improved sheave half.
Figure 3:
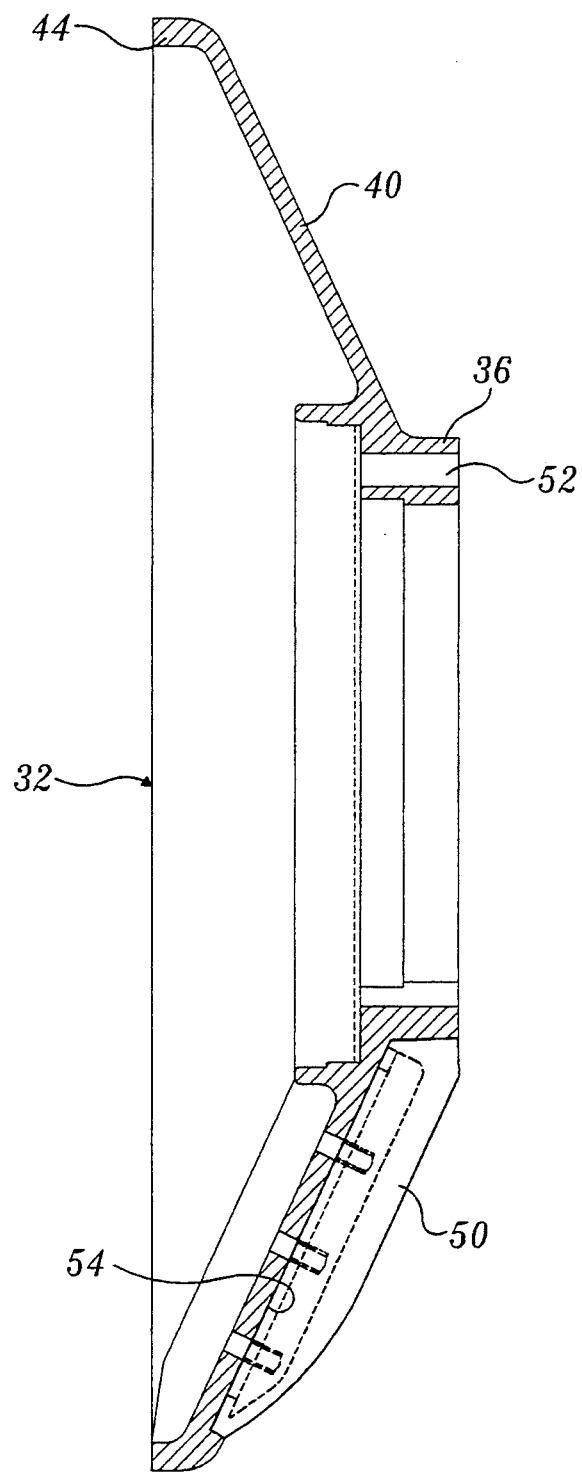
FIG. 3 is a partial cross-sectional view of FIG. 2 taken along section line 3—3.

Referring now to FIG. 2, the left sheave half 32 is illustrated detached from the right sheave half 34. Referring jointly to FIGS. 2 and 3, the hub portion 36 is annular in shape and is coaxial with the rotational axis of the sheave. A plurality of fastener receiving bores 52 are oriented substantially parallel to the rotational axis of the sheave and spaced circumferentially around the hub portion 36. The right sheave half 34 (FIG. 1) is joined to the left sheave half 32 by suitable fasteners, such as conventional bolts 51 that extend through the bores 52 in the left sheave half 32 and mutually aligned bores 53 in the right sheave half 34.

The hauling surface 40 of the sheave half carries a plurality of cleat receiving pockets 54 that extend from adjacent the hub portion 36 outwardly to a location adjacent the rim 44. The cleats 50 are seated in the pockets 54, as described in more detail below. The cleat pockets 54 are evenly spaced in a circumferential pattern about the sheave half 32. Similarly, an even number of fastener receiving bores 52 are provided in the hub portion 36. They are located such that the left sheave half 32 and the right sheave half 34 can be rotated relative to each other so that the cleat pockets 54 on one sheave half 32 are positioned between the cleats 50 on the opposing sheave half 34, thus creating an alternating pattern of cleats 50 around the assembled sheave 30.

Figure 5:
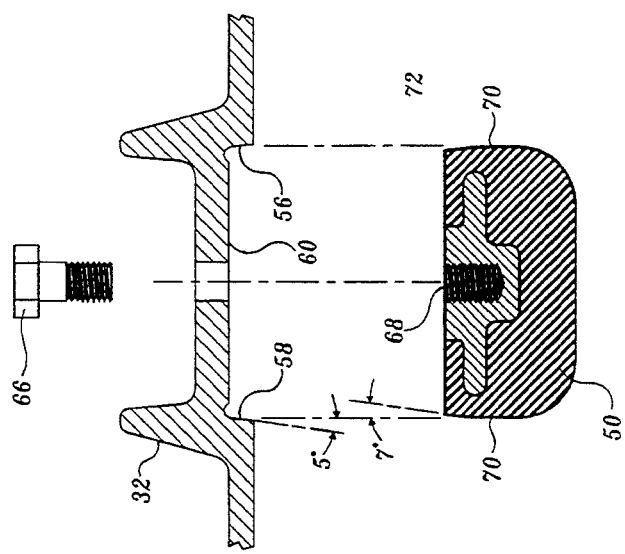
FIG. 5 is a cross-sectional view taken along a section line similar to 5—5, but showing the cleat exploded from the sheave pocket.
Figure 4B:
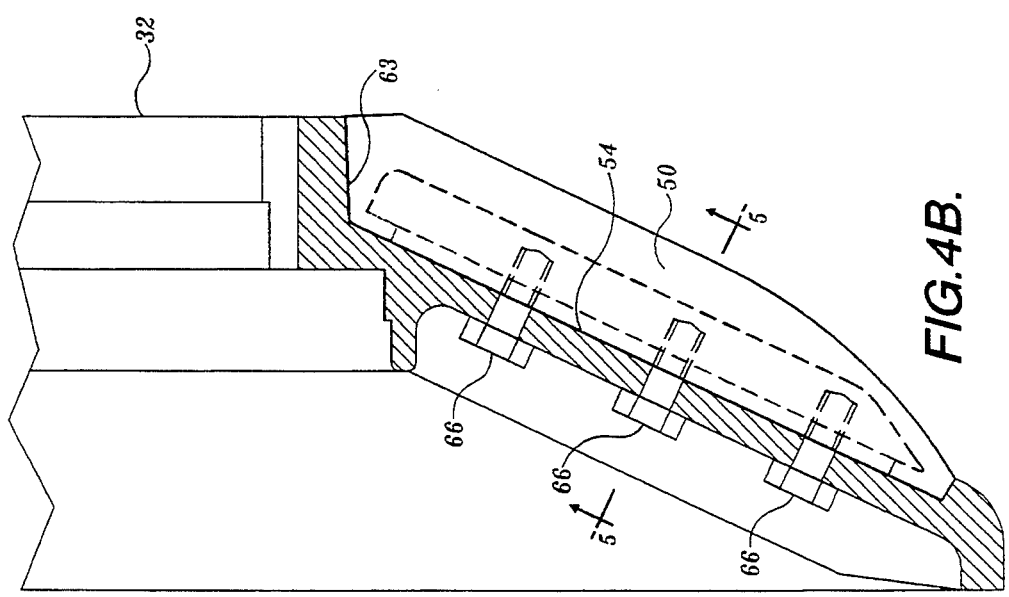
FIG. 4B is a view similar to FIG. 4A showing a cleat positioned in the pocket.
Figure 4A:
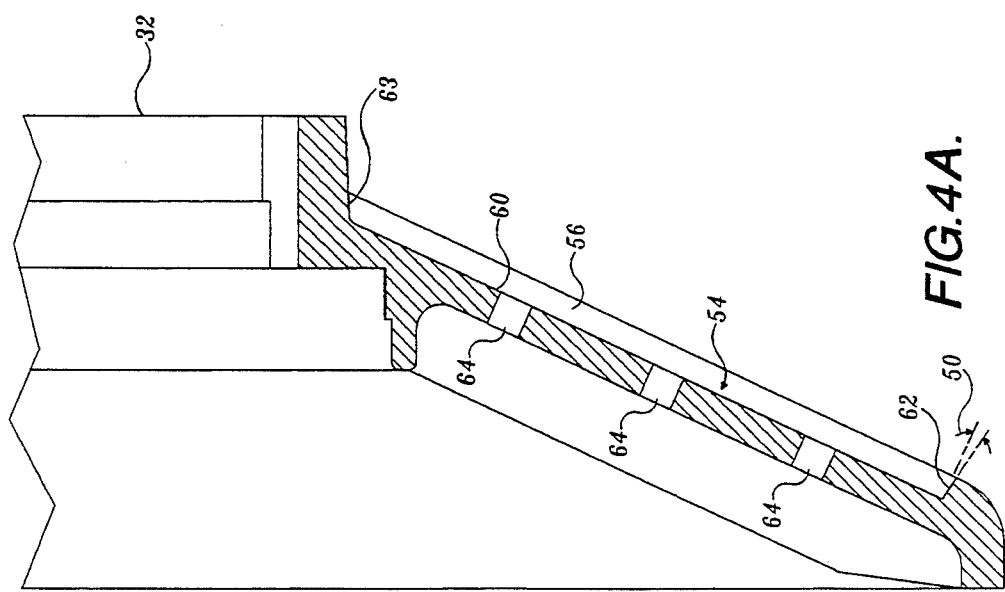
FIG. 4A is an enlarged view of the cleat pocket.
Figure 8:
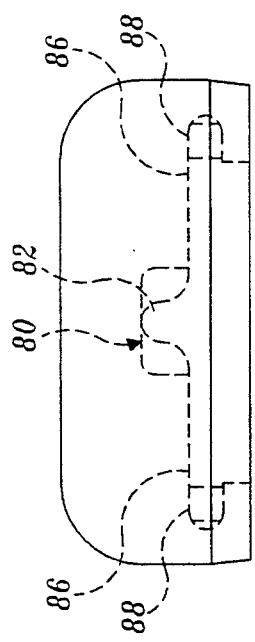
Figure 9:
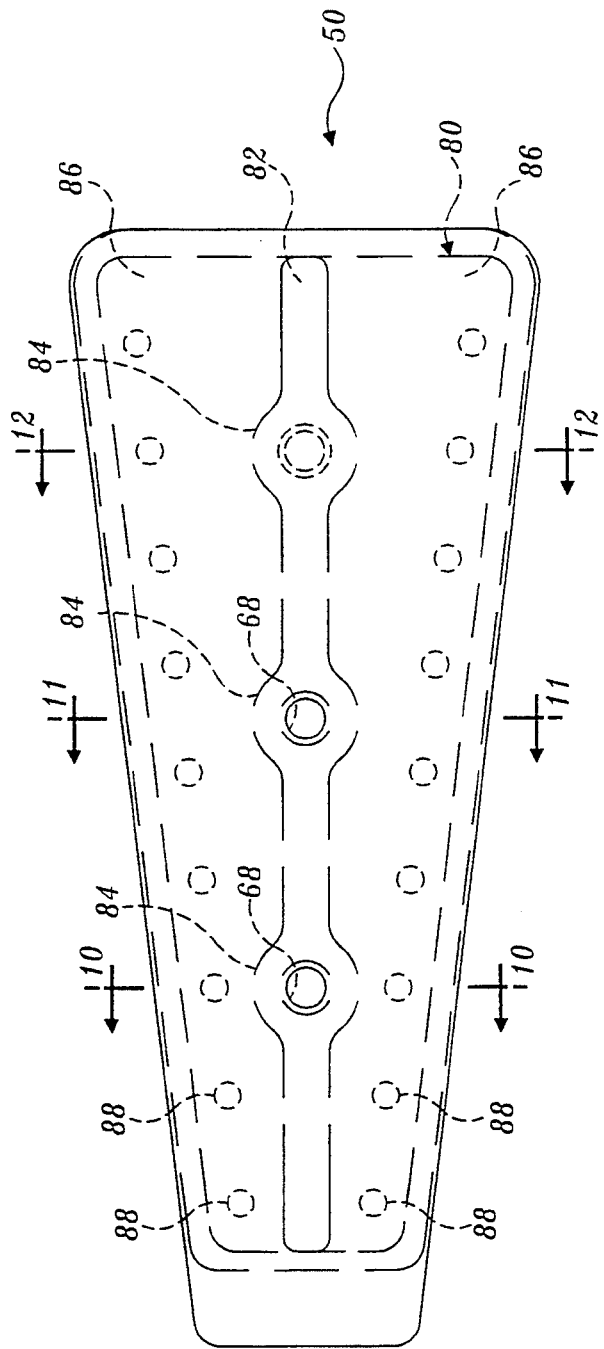
Figure 10:
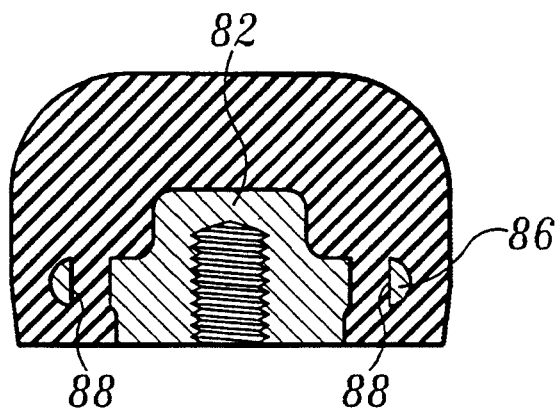
FIGS. 10, 11 and 12 are respectively cross-sectional views of the cleat taken along section lines 10—10, 11—11, 12—12 of FIG. 9.
Figure 11:
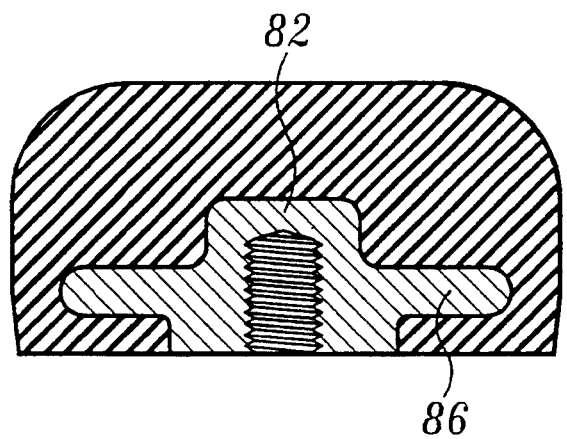
Figure 12:
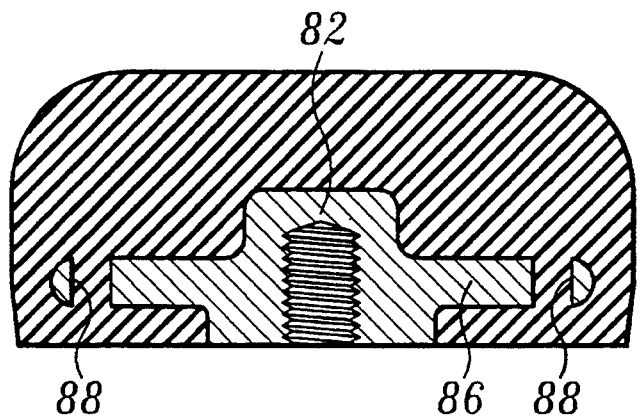

Referring now to FIGS. 4A, 4B and 5, the cleat pocket 54 is shown in enlarged detail. Cleat pocket 54 has side walls 56 and 58 and a bottom surface 60. The side walls 56 and 58 have a uniform height, thus providing a uniform depth to the pocket 54. This is accomplished by forming the side walls 56 and 58 so that each are independently substantially parallel to lines intersecting the rotational axis of the sheave 30 (see FIG. 2). The outer end wall 62 as well as the side walls 56 and 58 are angled slightly outwardly as they extend outwardly from the bottom surface 60. A preferred angle is approximately 5° from a line perpendicular to the bottom surface 60. The inner end wall 63 and the inner end of the cleat 50 are also angled at a 2° differential in a similar manner to assist in forming a tight fit between the cleat and the pocket. Fastener bores 64 extend from the bottom surface 60 to the opposite side of the sheave 30. As shown in FIG. 4B, the cleat 50 has internally threaded bores 68 aligned with the fastener bore 64. Conventional bolts 66 extend through the fastener bores 64 and engage the internally threaded bores 68 in the cleat 50. The cleat 50, shown in cross section in FIG. 5, has a lower portion that is seated in the pocket 54. The side walls 70 of the cleat 50 extend generally perpendicularly outwardly from the bottom surface 60 of the pocket 54. Adjacent the bottom 72 of the cleats, the side walls 70 are angled slightly inwardly, preferably at an angle on the order of 7°. The width of the pocket 54 and the cooperating angles of the side walls 56 and 58 and the cleat side walls 70 are adjusted so as to provide an interference fit when the cleat 50 is seated in the pocket 54. The interference fit, as well as the construction of the cleat 50 which will be described in more detail below, combine to prevent the edges of the cleat 50 from rolling upwardly when lateral forces are exerted on the cleat 50 as a net is being hauled.

Referring now to FIGS. 6 through 12, the cleat 50 has a rigid backbone 80 about which is molded a suitable wear-resistant gripping material. If desired, the gripping material can comprise a natural rubber compound that is formed about the cleat 50 and vulcanized. Synthetic polymeric materials such as polyisoprene or melt processable rubbers such as a halogenated polyolefin alloy are commercially available as "Alcryn" from Dupont in Wilmington, Del. The overall shape of the cleat 50 Is, of course, defined to correspond to the shape of the cleat receiving pockets 54. Thus, the inner end of the cleat 50 is narrower than the outer end. In addition, the cleat 50 has a substantially constant height throughout approximately three-fourths of its length running from its inner end near the hub portion 38 outwardly toward the rim 46. The outer one-quarter of the cleat 50 gradually reduces in height, so that adjacent its outer end its height is substantially equal to the depth of the cleat receiving pocket 54, so that the net will easily slide into the bight of the sheave.

The backbone 80 has a longitudinal rib 82 that extends the entire length of the cleat 50. The rib 82 contains three enlarged portions 84, which carry the threaded bores 68 for fastening the cleat 50 to the sheave 30. Extending laterally outwardly from the central portion of each side of the longitudinal rib 82 are webs 86. The upper portion of the rib 82 extending upwardly from the webs 86 serves to reinforce the molded portion of the cleat 50, placing it in compression when it is loaded rather than tn shear. The outer edges of the webs 86 are spaced inwardly from the outer edges of the cleat 50 so that no portion of the webs 86 are exposed. A plurality of openings 88 are located adjacent to longitudinal edges of the webs 86. When the gripping material is formed over the backbone 80, the material flows into the openings 88, thus integrating or tying the gripping material to the backbone 80. The backbone 80 and web 86 in combination with the pocket 54 and interference fit combine to provide a cleat 50 that is very strong and capable of intimately gripping the net. In addition, when lateral forces are placed on the cleat 50, the cleat 50 tends to remain rigid and does not roll or deform. Moreover, the cleats 50 are easily replaceable by removing the three fasteners 66 for each cleat 50, popping the cleats 50 out of the pocket 54 and replacing them.

The present invention has been described in conjunction with the preferred embodiment. One of ordinary skill will readily be able to make various changes, substitutions of equivalents and other alterations that do not depart from the broad scope of the Invention disclosed herein. It is therefore intended that the Letters Patent granted hereon be limited only by the definition contained in the appended claims and equivalents thereof.

The embodiments of the invention in which an exclusive property or privilege is claimed are defined as follows:

1. In a hauling block for nets or line, an improved sheave mounted for rotation on a frame to form a block, the improvement comprising:

a sheave having a central hub portion, said sheave having mutually opposing hauling surfaces extending outwardly from said hub portion, said hauling surfaces diverging as they extend outwardly from said hub portion, each side of said sheave terminating in a circumferential rim portion, each of said hauling surfaces having a plurality of cleat receiving pockets extending outwardly from said hub portion, said pockets having bottom surfaces and longitudinal side walls, cleats positioned in each of said pockets, each of said cleats including a rigid backbone, and a wear restraint gripping material shell formed around said backbone, said shell having a bottom portion sized to be received in said pocket, and means fastening said cleats to said sheave halves.

2. The improvement of claim 1, wherein said cleat has a gradually decreasing height adjacent said rim portion.

3. The improvement of claim 2, wherein said cleat has a lesser width at its inner end than at its outer end, said cleat gradually increasing in width from its inner end to its outer end.

4. The improvement of claim 3, wherein said backbone extends substantially the entire length of said cleat, said backbone having a longitudinal rib and a laterally extending web, said web being positioned intermediate the top and bottom of said rib, said rib having a plurality of fastener receiving bores therein communicating with the bottom surface of the cleat, said bores being spaced longitudinally along the bottom of said rib.

5. The improvement of claim 4, wherein said web extends laterally and sidewardly from both sides of said rib, the periphery of said web being spaced inwardly from the exterior surface of said cleat, said web being completely encased by said cleat material.

6. The improvement of claim 5, wherein the periphery of said web is spaced uniformly from the exterior surface of said cleat.

7. The improvement of claim 6, wherein said web has a plurality of holes spaced around the periphery thereof, said bores extending in a direction from bottom to top relative to said web, said bores receiving the gripping material of said shell when said shell is formed, thereby integrating said shell with said web.

8. In a hauling block for nets or line, an improved sheave mounted for rotation on a frame to form a block, the improvement comprising:

a sheave having a central hub portion, said sheave having mutually opposing hauling surfaces extending outwardly from said hub portion, said hauling surfaces diverging as they extend outwardly from said hub portion, each side of said sheave terminating in a circumferential rim portion, each of said hauling surfaces having a plurality of cleat receiving pockets extending outwardly from said hub portion, said pockets having bottom surfaces and longitudinal side walls, cleats positioned in each of said pockets, said cleats having side walls, the side walls of said cleats and the side walls of said pockets being angled relative to each other so as to provide an interference fit when said cleats are seated in said pocket, and means fastening said cleats to said sheave.

9. In a hauling block for nets or line, an improved sheave mounted for rotation on a frame to form a block, the improvement comprising:

a sheave having a central hub portion, said sheave having mutually opposing hauling surfaces extending outwardly from said hub portion, said hauling surfaces diverging as they extend outwardly from said hub portion, each side of said sheave terminating in a circumferential rim portion, each of said hauling surfaces having a plurality of cleat receiving pockets extending outwardly from said hub portion, said pockets having bottom surfaces and longitudinal side walls, and cleats positioned in each of said pockets, the side walls of said cleats and the side walls of said pockets being angled relative to each other so as to provide an interference fit when said cleats are seated in said pocket, and means fastening said cleats to said sheave halves.

10. In a hauling block for nets or line, an improved sheave mounted for rotation on a frame to form a block, the improvement comprising:

a heave having a central hub portion, said sheave having mutually opposing hauling surfaces extending outwardly from said hub portion, said hauling surfaces diverging as they extend outwardly from said hub portion, each side of said sheave terminating in a circumferential rim portion, each of said hauling surfaces having a plurality of cleat receiving pockets extending outwardly from said hub portion, said pockets having bottom surfaces and longitudinal side walls, and cleats positioned in each of said pockets, each of said cleats having a rigid backbone, and a wear restraint gripping material shell formed around said backbone, said shell having a bottom portion sized to be received in said pocket, said cleat having sufficient thickness relative to said pocket so that it extends outwardly from the hauling surface of one sheave half toward the mutually opposing hauling surface of the other sheave half, and means fastening said cleats to said sheave halves.

* * * * *